US011255377B2

(12) United States Patent
Hagiya et al.

(10) Patent No.: US 11,255,377 B2
(45) Date of Patent: Feb. 22, 2022

(54) TILTING-PAD-TYPE JOURNAL BEARING

(71) Applicant: Hitachi Industrial Products, Ltd., Tokyo (JP)

(72) Inventors: Isao Hagiya, Tokyo (JP); Naohiko Takahashi, Tokyo (JP); Jun Ichimura, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 345 days.

(21) Appl. No.: 16/328,424

(22) PCT Filed: Oct. 24, 2017

(86) PCT No.: PCT/JP2017/038278
§ 371 (c)(1),
(2) Date: Feb. 26, 2019

(87) PCT Pub. No.: WO2018/123235
PCT Pub. Date: Jul. 5, 2018

(65) Prior Publication Data
US 2021/0285486 A1 Sep. 16, 2021

(30) Foreign Application Priority Data
Dec. 28, 2016 (JP) .............................. JP2016-254796

(51) Int. Cl.
*F16C 17/03* (2006.01)
*F16C 33/10* (2006.01)

(52) U.S. Cl.
CPC .............. *F16C 17/03* (2013.01); *F16C 33/10* (2013.01)

(58) Field of Classification Search
CPC .......... F16C 17/03; F16C 33/10; F16C 37/002
See application file for complete search history.

(56) References Cited

U.S. PATENT DOCUMENTS

| 6,361,215 B1 | 3/2002 | Wilkes et al. |
| 6,739,756 B2 * | 5/2004 | Miller .................. F16C 33/108 384/117 |

(Continued)

FOREIGN PATENT DOCUMENTS

| JP | 7-174136 A | 7/1995 |
| JP | 2000-274432 A | 10/2000 |

(Continued)

OTHER PUBLICATIONS

International Search Report (PCT/ISA/210) issued in PCT Application No. PCT/JP2017/038278 dated Dec. 26, 2017 with English translation (five pages).

(Continued)

Primary Examiner — James Pilkington
(74) Attorney, Agent, or Firm — Crowell & Moring LLP

(57) ABSTRACT

A tilting-pad-type journal bearing includes a rotary shaft, a plurality of tilting pads, a housing, a fixing structure, an oil inlet, and side plates. The plurality of tilting pads support the rotary shaft in a radial direction. The housing accommodates the plurality of tilting pads inside. The fixing structure fixes a circumferential relative position with respect to the housing while allowing the tilting pads to swing. The oil inlet supplies lubricating oil between the tilting pads and the rotary shaft. The side plates are provided on both sides of the housing in a rotational-axis direction.

11 Claims, 11 Drawing Sheets

(56) References Cited

U.S. PATENT DOCUMENTS

| | | | |
|---|---|---|---|
| 9,169,866 B2 * | 10/2015 | Sato | ................... F16C 17/045 |
| 9,746,024 B2 * | 8/2017 | Sato | ................... F16C 17/03 |
| 2003/0142890 A1 | 7/2003 | Miller | |
| 2015/0132105 A1 | 5/2015 | Hemmi et al. | |

FOREIGN PATENT DOCUMENTS

| | | |
|---|---|---|
| JP | 2015-94373 A | 5/2015 |
| JP | 2015-124775 A | 7/2015 |
| JP | 2016-217364 A | 12/2016 |

OTHER PUBLICATIONS

Japanese-language Written Opinion (PCT/ISA/237) issued in PCT Application No. PCT/JP2017/038278 dated Dec. 26, 2017 (five pages).

* cited by examiner

TILTING-PAD-TYPE JOURNAL BEARING

TECHNICAL FIELD

The present invention relates to a tilting-pad-type journal bearing used for supporting a rotary shaft of a large rotating machine such as a generator, a turbine, or a compressor, and particularly appropriate to a high-speed rotating machine which requires high vibration-resisting stability.

BACKGROUND ART

As background arts of the journal bearing, journal bearings disclosed in Japanese Patent Application Laid-Open No. Hei 7-174136 (PTL 1) and U.S. Pat. No. 6,361,215 (PTL 2) are known.

In the journal bearing in the PTL 1, a turbulent transition layer for transition of an oil flow state of lubricating oil from a laminar flow to a turbulence is provided in the vicinity of a minimum oil film position in which the temperature of the bearing metal is maximum so as to prevent temperature rise of the bearing metal due to high load on the bearing and high-speed rotation (see the abstract). Further, PTL 1 discloses, as an example of the turbulent transition layer, a structure where a groove as a concave part is formed in the vicinity of the minimum oil film position of the bearing metal in an axial direction of the rotary shaft (paragraph 0051 and FIG. 7).

Further, the journal bearing in the PTL 2 is a directional tilting-pad-type journal bearing which has an operation surface in contact with a shaft, and a channel formed in a slim shape along a side part of the operation surface to collect lubricating oil toward the side part of the operation surface and to redirect the oil to the bearing operation surface (see the abstract, 5th paragraph lines 31 to 51, and FIG. 3).

CITATION LIST

Patent Literature

PTL 1: Japanese Patent Application Laid-Open No. Hei 7-174136
PTL 2: U.S. Pat. No. 6,361,215

SUMMARY OF INVENTION

Technical Problem

In the journal bearing in the PTL 1, the cooling operation for the bearing is improved by causing a turbulence. However, with the spread of high-speed rotating machine such as a centrifugal compressor, the bearing cooling operation might be insufficient merely by causing a turbulence as in the case of the journal bearing in the PTL 1. In the journal bearing in PTL 2, the lubricating oil on the bearing operation surface is collected to the center in the rotational-axis direction to increase carry-over oil so as to avoid shortage of lubricating oil and maintain lubricating characteristic. However, in the journal bearing in PTL 1, the carry-over oil, heated on the bearing operation surface to have high temperature, is re-directed in the channel and is returned onto the bearing operation surface. Accordingly, the cooling operation for the bearing (tilting pad: hereinbelow, referred to as a "pad") is lowered, and the temperature of the pad is increased.

The purpose of the present invention is to provide a tilting-pad-type journal bearing capable of improving pad cooling performance of lubricating oil and reducing the pad temperature.

Solution to Problem

To attain the above-described purpose, the tilting-pad-type journal bearing according to the present invention is, a tilting-pad-type journal bearing comprising: a rotary shaft; a plurality of tilting pads that support the rotary shaft in a radial direction; a housing that accommodates the plurality of tilting pads inside; a fixing structure that fixes a circumferential relative position with respect to the housing while allows the tilting pads to swing; an oil inlet that supplies lubricating oil between the tilting pads and the rotary shaft; and side plates provided on both sides of the housing in a rotational-axis direction, wherein among the plurality of tilting pads, a tilting pad provided in at least a lowest position with a loading direction as a downward direction, and a tilting pad provided adjacent to the tilting pad provided in the lowest position on the rotational upstream side, have a concave part, formed to be a down step part from a sliding surface facing the rotary shaft toward a rotational downstream side, and a down step part from the sliding surface from the center of the tilting pad in the rotational-axis direction toward a rotational-axis direction side end, at both side ends of the sliding surface in the rotational axis direction, and wherein in the concave part, the side end side of the tilting pad in the rotational-axis direction is opened toward the inside of the housing.

Advantageous Effects of Invention

In the tilting-pad-type journal bearing according to the present invention, it is possible to improve the pad cooling performance of the lubricating oil and to reduce the pad temperature. Other objects, the features and advantages than those described above may be clear with the following description of examples.

DESCRIPTION OF EMBODIMENTS

Figure 1:
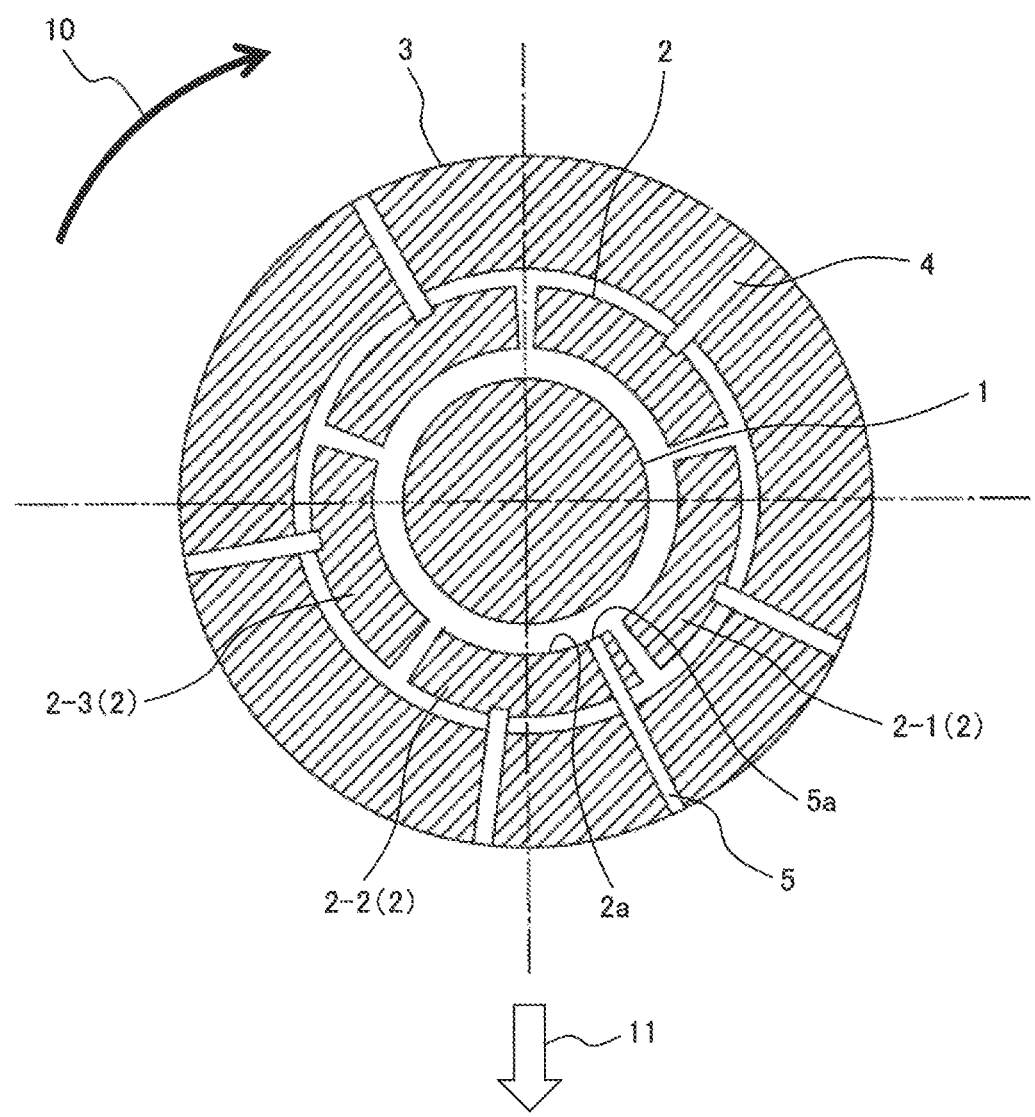
FIG. 1 is a schematic diagram showing a cross section of a tilting-pad-type journal bearing according to an example 1, viewed from a rotational-axis direction.

First, a tilting-pad-type journal bearing to which the present invention is applied will be described.

A rotating machine such as a centrifugal compressor is provided with a journal bearing to support a high-speed rotary shaft in a diameter direction. Especially when high stability with respect to vibration is required, a tilting-pad-type journal bearing is used. The tilting-pad-type journal bearing has high stability with respect to self-excited vibration in comparison with other cylindrical bearings and elliptical bearings. This stability is obtained by providing plural tilting pads (hereinbelow referred to "pad" in some cases) to support the rotary shaft via an oil film, swingably, at predetermined intervals in a shaft circumferential direction, to reduce a coupled spring force of the bearing which makes shaft vibration unstable.

The rotating machine such as a centrifugal compressor, when capable of high speed operation, improves the efficiency in some cases. However, when this tilting-pad-type journal bearing is applied to a rotary shaft which rotates at a high circumferential speed, as the amount of heat generation is increased on a sliding surface with respect to the rotary shaft, it is necessary to also increase pad cooling operation with lubricating oil which flows between them. As a conventional pad sliding surface, a material called white metal is used. The heat-resistant temperature of white metal is about 120° C. There is a possibility that when the rotary shaft is rotated at a high circumferential speed, the temperature of the pad sliding surface exceeds the heat-resistant temperature of white metal.

When the lubricating oil which acted in one pad (pad 2-1 or first pad) flows in its adjacent pad on the downstream side (pad 2-2 or second pad), as the lubricating oil has been heated with the pad 2-1, the temperature of the lubricating oil is increased. At this time, in the adjacent pad 2-2, as the temperature of the lubricating oil is higher than oil feeding temperature, the pad temperature is increased. The temperature-raised lubricating oil will be referred to as "carry-over oil". That is, it is possible to reduce the pad temperature by reducing the amount of the carry-over oil.

As oil feeding methods for the lubricating oil in the tilting-pad-type journal bearing, two types of methods, flood type and directed type feedings are known. In the flood type feeding, the lubricating oil in a housing is sealed and held with side plates attached to both sides of the housing, and the lubricating oil is supplied to the bearing surface. On the other hand, in the directed type feeding, an oil nozzle is used as an oil inlet. The lubricating oil is inject-supplied in the vicinity of the sliding surface from the oil nozzle provided between the pads or on the pad sliding surface. In the case of the directed type feeding, by omitting the side plates or expanding the seal width of the side plates, the lubricating oil is positively discharged in the axial direction (pad width direction) of the rotary shaft. In the directed type feeding, it is possible to further reduce the pad temperature in comparison with the flood type feeding. On the other hand, it is important to appropriately supply the lubricating oil to maintain the lubricating characteristic and to prevent oil scattering to other parts provided outside the bearing.

Next, the characteristic of the tilting-pad-type journal bearing explained in the following examples will be described. Note that "rotational upstream side" is the side to return in reverse direction of the rotational direction with respect to a reference point. "Rotational downstream side" is the side to advance in the rotational direction with respect to the reference point. When a rotary shaft 1 rotates, lubricating oil flows between an outer peripheral surface 1a of the rotary shaft 1 and an inner peripheral surface (sliding surface) 2a of a tilting pad 2. In this case, the "rotational upstream side" corresponds with the upstream side in the flow direction of the lubricating oil. The "rotational downstream side" corresponds with the downstream side in the flow direction of the lubricating oil. Further, a direction along the axis of the rotary shaft 1 will be referred to as "rotational-axis direction", or simply "axial direction".

The tilting-pad-type journal bearing according to the examples explained below has: a rotary shaft which extends in an axial line direction; plural tilting pads which support the rotary shaft in a radial direction; a housing which accommodates the plural tilting pads inside while supports the tilting pads swingably; a fixing structure which fixes relative positions between the tilting pads and the housing in a circumferential direction; an oil inlet for oil feeding the lubricating oil between the tilting pads and the rotary shaft; and side plates provided on the both sides of the housing in the rotational-axis direction. Among the plural tilting pads, at least a tilting pad provided in a lowest position in the loading direction as the lower side, and a tilting pad, provided adjacent on the rotational upstream side to the tilting pad positioned in the lowest position, are provided with a down step part formed to be lower viewed from the pad sliding surface side, assuming that the pad sliding surface is on the upper side while the back surface side of the pad sliding surface is on the lower side, on the rotational downstream side of the pad sliding surface and at both ends (both sides of the pad sliding surface) of the pad sliding surface in the rotational-axis direction.

According to the tilting-pad-type journal bearing having this construction, it is possible to improve heat transmission between the lubricating oil and the pad sliding surface and to reduce the pad temperature, by inducing a separating flow and a re-attaching flow, i.e., so-called backward facing step flow on the both sides of the tilting pad in the rotational-axis direction. Further, in the down step part, as the gap width between the rotary shaft and the tilting pad is wide and the pressure is low, it is possible to induce discharge of the lubricating oil from center of the tilting pad in the rotational-axis direction to the end in the rotational-axis direction (pad side part). With this configuration, it is possible to suppress flow of the lubricating oil which has been heated with a heat source at the axial center and has high temperature (carry-over oil) into the sliding surface of the tilting pad provided adjacent on the rotational downstream side, to suppress rise of the pad temperature. Further, as the side plates are provided, it is possible to limit the places where the lubricating oil discharged in the rotational-axis direction is scattered to the outside the bearing and to appropriately suppress oil scattering to the other parts outside the bearing. Further, it is possible to select a pad with high risk of exceeding heat resisting temperature of the bearing surface to reduce the temperature, while suppress increase of oil scattering amount to the outside, by limiting setting of the down step part to the tilting pad provided in the lowest position the pad temperature of which becomes maximum and to the adjacent tilting pad on the upstream side as a carry-over oil inflow source, among the plural tilting pads. The above-described configuration is especially effective when white metal with low heat-resistant temperature is used as the bearing surface.

Further, in the tilting-pad-type journal bearing according to the examples explained below, it is desirable that at least three or more oil inlets are provided in the rotational-axis direction, respectively at the center of the down step part in the rotational-axis direction and at the center of the tilting pad in the rotational-axis direction. According to this configuration, it is possible to suppress deterioration of lubricating characteristic, e.g., gathering of the lubricating oil within a partial range in the rotational-axis direction, with which the lubricating oil does not flow into the down step part, to disturb the backward facing step flow, and local shortage of the lubricating oil with which breakage of the oil film occurs.

Further, in the tilting-pad-type journal bearing according to the examples explained below, it may be configured such that the oil inlet, with the radial position of its exit being about the same as the inner diameter of the tilting pad, is provided so as to pass through the plural tilting pads, and the side plates are provided, with the size of the gap between the side plates and the rotary shaft (side plate gap) widened to 2 mm or greater. According to this configuration, it is possible to discharge most of the lubricating oil, which has absorbed heat from the pad sliding surface of the above-described tilting pad as a heat generating source to have high temperature, in the axial direction, and to further lower the pad temperature.

On the other hand, in the tilting-pad-type journal bearing according to the examples explained below, it may be an flood type tilting-pad-type journal bearing configured such that the oil inlet, with the radial position of its exit being almost the same as the inner diameter of the housing, is provided in the housing, and the side plates are provided with the size of the gap between the side plates and the rotary shaft (side plate gap) narrowed to 1 mm or smaller. According to this configuration, it is possible to further promote improvement of lubricating characteristic and further reduce oil scattering to the outside.

Further, in the tilting-pad-type journal bearing according to the examples explained below, it is desirable that the side plates have an opening in the radial positions facing the gap between the housing and the outer peripheral surface (back surface) of the tilting pad provided in the lowest position. According to this configuration, it is possible to effectively discharge the carry-over oil staying in the gap between the housing and the tilting pad provided in the lowest position in the rotational-axis direction. Further it is possible to effectively lower the pad temperature of the tilting pad provided in the lowest position which becomes the highest. In the sliding surface position of the tilting pad provided in the lowest position (radial position of the sliding surface), the side plate gap may be enlarged to be larger than that in other circumferential positions. With this configuration, it is possible to increase the discharge amount of the carry-over oil between the rotary shaft and the tilting pad provided in the lowest position. It is possible to further lower the pad temperature of the tilting pad provided in the lowest position by providing the above-described opening and further enlarging the above-described side plate gap.

Further, in the tilting-pad-type journal bearing according to the examples explained below, it is desirable to provide plural down step parts. With this configuration, it is possible to induce the separating flow and re-attaching plural times to increase a region with a high heat-transfer coefficient, and to lower the pad temperature.

In the present specification, the direction along the axis of the rotary shaft 1 (shaft axis) will be referred to as "rotational-axis direction". As described above, the tilting pad 2 will be referred to as "pad" when described in some cases. Further, the operation surface of the tilting pad 2 may be referred to as "sliding surface" or "bearing surface" when described.

Hereinbelow, the examples of the present invention will be described in detail using the drawings. At this time, in the drawings shown below, the same members or corresponding members have the same reference numerals, and overlapped explanations will be omitted. The sizes and shapes of the members will be schematically shown. For example, in FIG. 1, the width of the gap between the rotary shaft 1 and the tilting pad 2 is drawn to be larger than an actual gap for the sake of explanation.

Example 1

Hereinbelow, an example 1 according to the present invention will be described in detail with reference to FIGS. 1 to 4 and FIG. 5. In the present example, an example of a directed-type LOP (Load On Pad) tilting-pad-type journal bearing used in a high-pressure centrifugal compressor will be shown.

FIG. 1 is a schematic diagram showing a cross section of the tilting-pad-type journal bearing according to the example 1, viewed from a rotational-axis direction. That is, FIG. 1 shows the shape of a cross section in a vertical direction with respect to the shaft axis of the rotary shaft 1.

As shown in FIG. 1, the tilting-pad-type journal bearing has plural tilting pads 2 to support the rotary shaft 1 in the circumferential direction of the rotary shaft 1. Especially the LOP type journal bearing has five tilting pads 2. One pad is provided in a loading direction 11. Note that generally, the loading direction 11 is a vertical downward direction.

The five tilting pads 2 are provided in fixed circumferential positions with respect to a housing 3 while swingably supported with a fixing structure (fixing mechanism or a fixing member) 4 in the housing 3. An oil inlet 5, with the radial position of an exit 5*a* being approximately equal to the inner diameter of the tilting pad 2, is provided through a part of the sliding surface 2*a* on the rotational upstream side, although not shown, in all the titling pads 2. In this configuration, the exit 5*a* of the oil inlet 5 is opened on the sliding surface 2*a* side of the tilting pad 2. In the respective tilting pads 2, lubricating oil is inject-supplied in the vicinity of the sliding surface 2*a*. Note that as in the case of an example 3 to be described later, the exit 5*a* of the oil inlet 5 may be opened in the bottom of a groove 15 formed in the sliding surface 2*a* in some cases.

Figure 2:
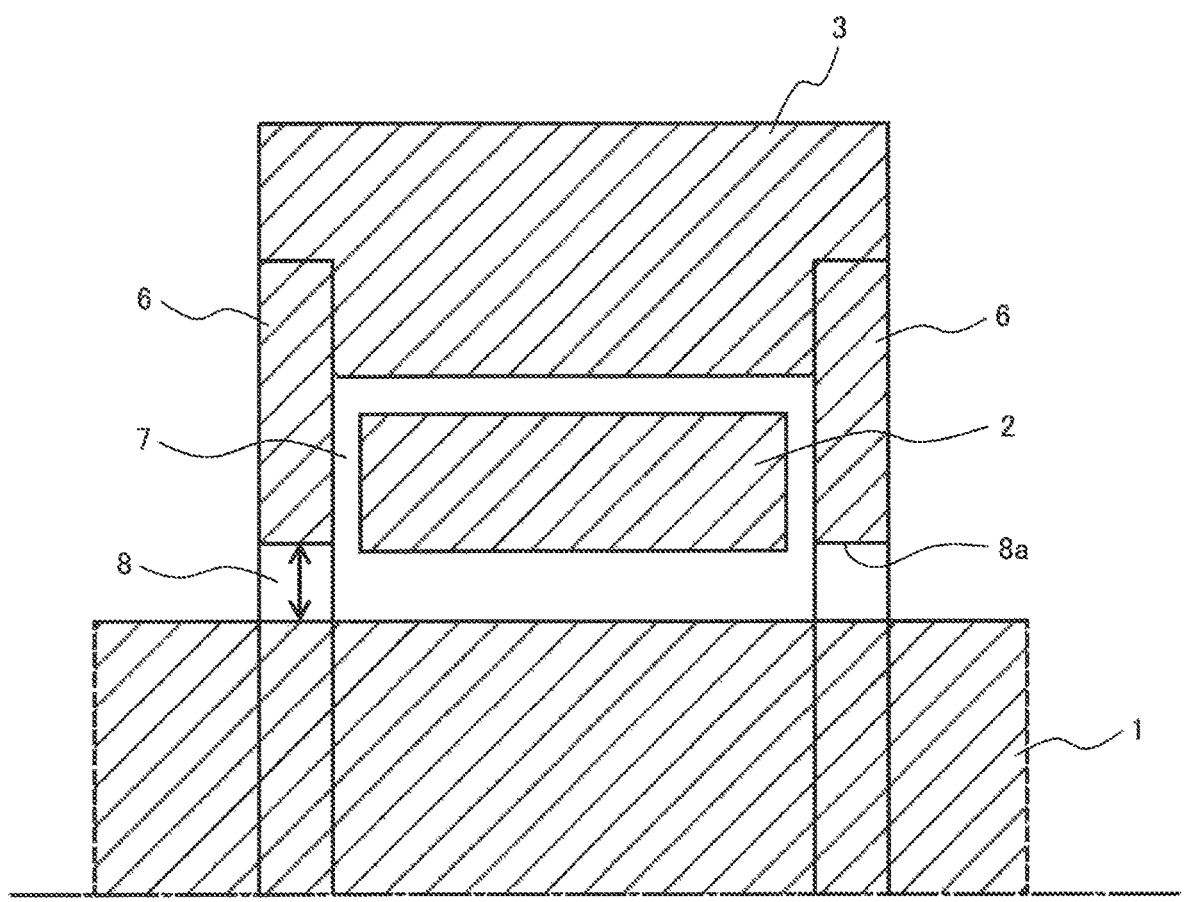
FIG. 2 is a cross-sectional diagram of the tilting-pad-type journal bearing according to the example 1, viewed from a direction different from that in FIG. 1 (direction vertical to the rotational-axis direction), and a schematic diagram showing one side with respect to a rotational-axis center.

FIG. 2 is a cross-sectional diagram of the tilting-pad-type journal bearing according to the example 1, viewed from a direction different from that in FIG. 1 (direction vertical to the rotational-axis direction), and a schematic diagram showing one side with respect to a rotational axis center. That is, FIG. 2 shows the cross-sectional shape of the rotary shaft 1 in a shaft axis direction.

As shown in FIG. 2, the tilting-pad-type journal bearing according to the present example has side plates 6. The side plates 6 are assembled in the housing 3 while they are provided to cover side surfaces (end surfaces (ends) in the rotational-axis direction) of the tilting pad 2. There is an inter-side surface gap 7 between the side plates 6 and the respective tilting pads 2. An inter-side plate gap 8 is provided between the side plates 6 and the rotary shaft 1. The side plates 6 are provided such that the width of the inter-side plate gap 8 is 2 mm or wider. That is, the side plate 6 is provided with an opening (through hole) 8a through which the rotary shaft 1 is passed, and the opening 8a is formed to have a diameter larger than the diameter of the rotary shaft 1 by 4 mm or larger.

Figure 3A:
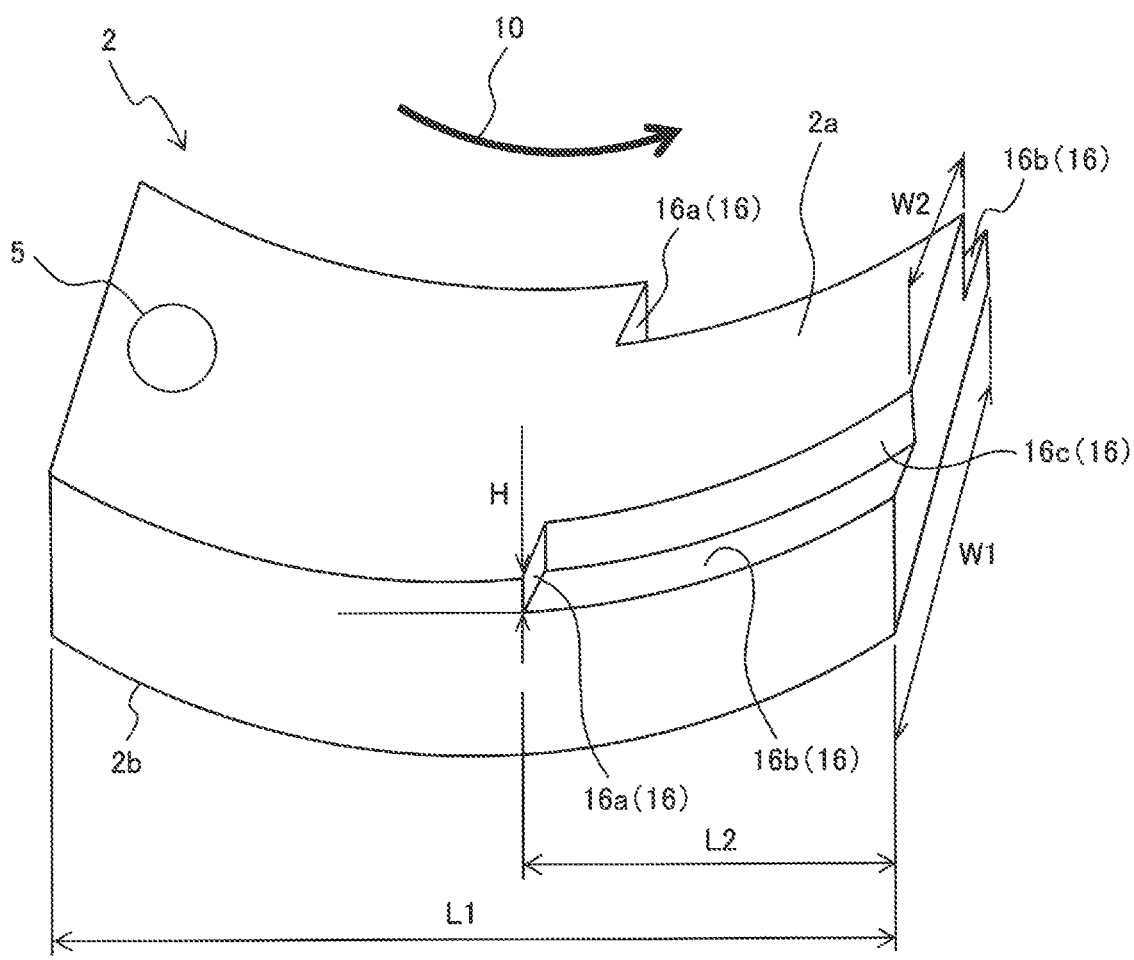
FIG. 3A is a schematic diagram of a tilting pad according to the example 1, viewed from a diagonal direction.

FIG. 3A is a schematic diagram of the tilting pad according to the example 1, viewed from a diagonal direction.

Assuming that the pad sliding surface 2a is the upper side while the back surface side (surface on the housing 3 side) 2b of the tilting pad 2 is the lower side, the tilting pad 2 according to the present example has down step parts 16a and 16b formed to be lower viewed from the pad sliding surface 2a side, at both ends of the sliding surface 2a in the rotational-axis direction and on the downstream side of a rotational direction 10. That is, the down step parts 16a and 16b are a down step surface formed from the pad sliding surface 2a formed as an upper surface toward the back surface side of the tilting pad 2 (down step surface from the rotational upstream side toward the downstream side) 16a, and a bottom surface 16b formed as a lower surface. In the present example, the step surface 16a is formed outward in the radial direction. However, it is not necessary that the step surface 16a is along the radial direction. The step surface may be inclined with respect to the radial direction as long as the step surface is formed so as to induce a backward facing step flow to be described later.

Further, seen from the rotational-axis direction, down step parts (side surfaces of a concave part 16) 16c and 16b are formed, from the center side of the pad sliding surface 2a toward the ends, at both ends of the pad sliding surface 2a in the rotational-axis direction. That is, the down step parts 16c and 16b are a down step surface 16c formed from the pad sliding surface 2a formed as an upper surface toward the back surface side of the tilting pad 2 and a bottom surface 16b formed as a lower surface.

The concave part 16 is formed with the down step parts 16a and 16b and the down step parts 16c and 16b at the both ends of the sliding surface 2a in the rotational-axis direction. In the present example, the concave part 16 has the step surface 16c on the center side of the pad sliding surface 2a in the rotational-axis direction. The step surface 16c is extended in a/the? circumferential direction. On the other hand, on the side end side of the tilting pad 2 in the rotational-axis direction, the concave part 16 is opened.

Further, in the concave part 16, the downstream side end of the tilting pad 2 is opened. However, it is not necessary that the downstream side end of the concave part 16 is opened as long as the concave part is formed to have a sufficient length in the circumferential direction such that the concave part 16 (down step parts 16a and 16b) induce the backward facing step flow to be described later. As in the case of the present example, it is possible to infallibly induce the backward facing step flow and it is possible to increase the amount of the lubricating oil discharged from the side end of the tilting pad 2 to the outside the tilting pad 2, by providing the concave part 16 to the downstream side end of the tilting pad 2, such that the downstream side end of the concave part 16 is in an opened state.

In the present example, the step surface 16c is formed as a surface vertical to the rotary shaft 1. However, it is not necessary that the step surface 16c is vertical to the rotary shaft 1 as long as the step surface is formed to have a length in the circumferential direction to induce the backward facing step flow to be described later. Further, in the present example, the bottom surface 16b of the concave part 16 is formed as a parallel surface having a height lower than the pad sliding surface 2a by H. However, the bottom surface is not limited to this shape as long as it is configured to obtain a cooling effect with the backward facing step flow to be described later.

Figure 3B:
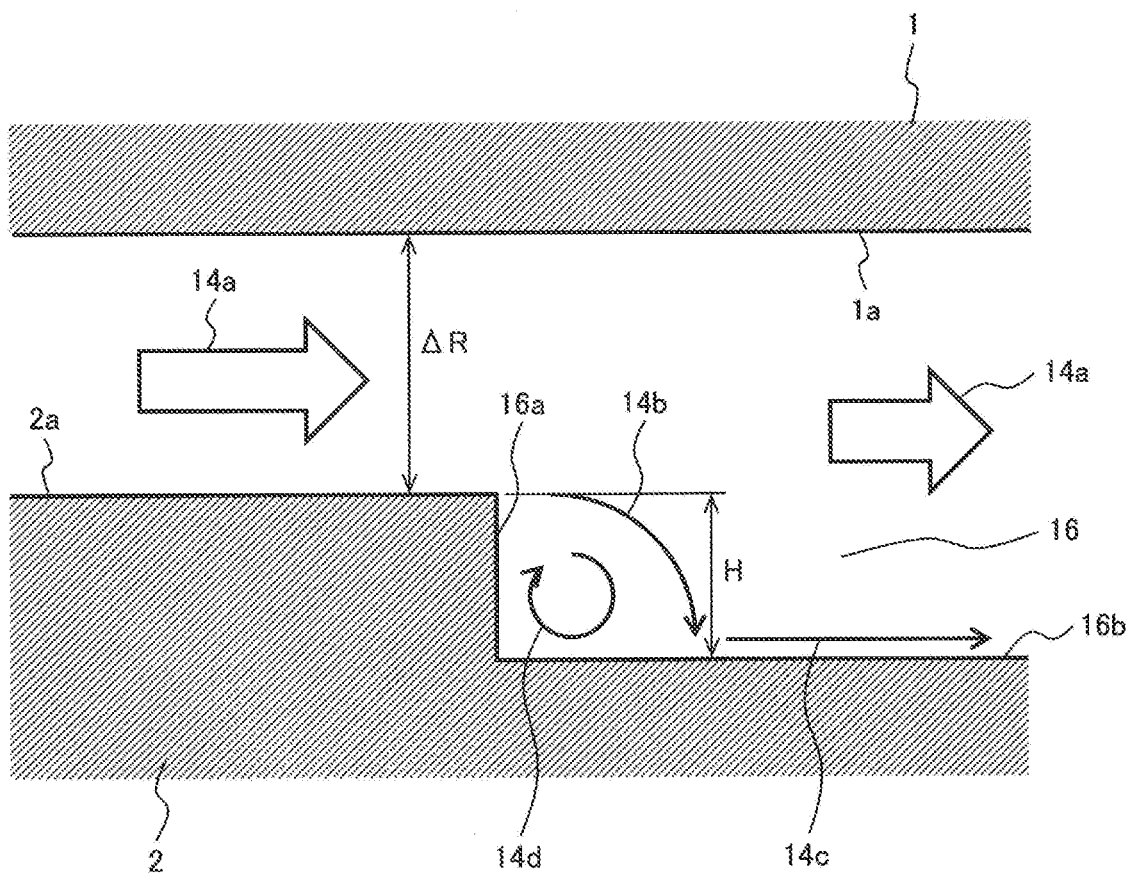
FIG. 3B is a schematic diagram for explaining a backward facing step flow.

The backward facing step flow will be described using FIG. 3B. FIG. 3B is a schematic diagram for explaining the backward facing step flow. Note that in FIG. 3B, an outer peripheral surface 1a of the rotary shaft 1, the pad sliding surface 2a, and the bottom surface 16b of the concave part 16 are drawn, by ignoring curvatures, but using straight lines.

In FIG. 3B, reference numeral 14a denotes a main stream of the lubricating oil. A separating flow 14b from the step upper surface (pad sliding surface 2a), a re-attaching flow 14c on the downstream side of the step bottom surface 16b, and a vortex flow 14d in the vicinity of the step surface 16a (so-called backward facing step flow) of the lubricating oil is induced with the down step parts 16a and 16b. The backward facing step flow 14d has an especially high heat transmitting characteristic among the turbulent forms, accordingly, in comparison with the conventional tilting-pad-type journal bearing in which the form of flow field of the lubricating oil is a general laminar flow, it is possible to reduce the temperature of the tilting pad 2.

A step height H is larger than the half of the difference between the process radius of the sliding surface 2a of the tilting pad 2 and the radius of the rotary shaft 1. It is desirable that to generate a backward facing step flow, the step height H is larger than the half of the radial length ΔR of the upstream-side main-stream channel. Further, it is desirable that the ratio between an outer peripheral surface width W1 and a sliding surface width W2 at a lower side end of the tilting pad 2 is approximately 0.7. When the width of the pad 2 is reduced, the bearing surface pressure is increased inversely. On the other hand, the ratio between a recommended maximum value and an allowable value of the bearing surface pressure is generally about 0.6. To prevent the bearing surface pressure from exceeding the allowable value, the ratio between the outer peripheral surface width W1 and the sliding surface width W2 is set to approximately 0.7.

Figure 4:
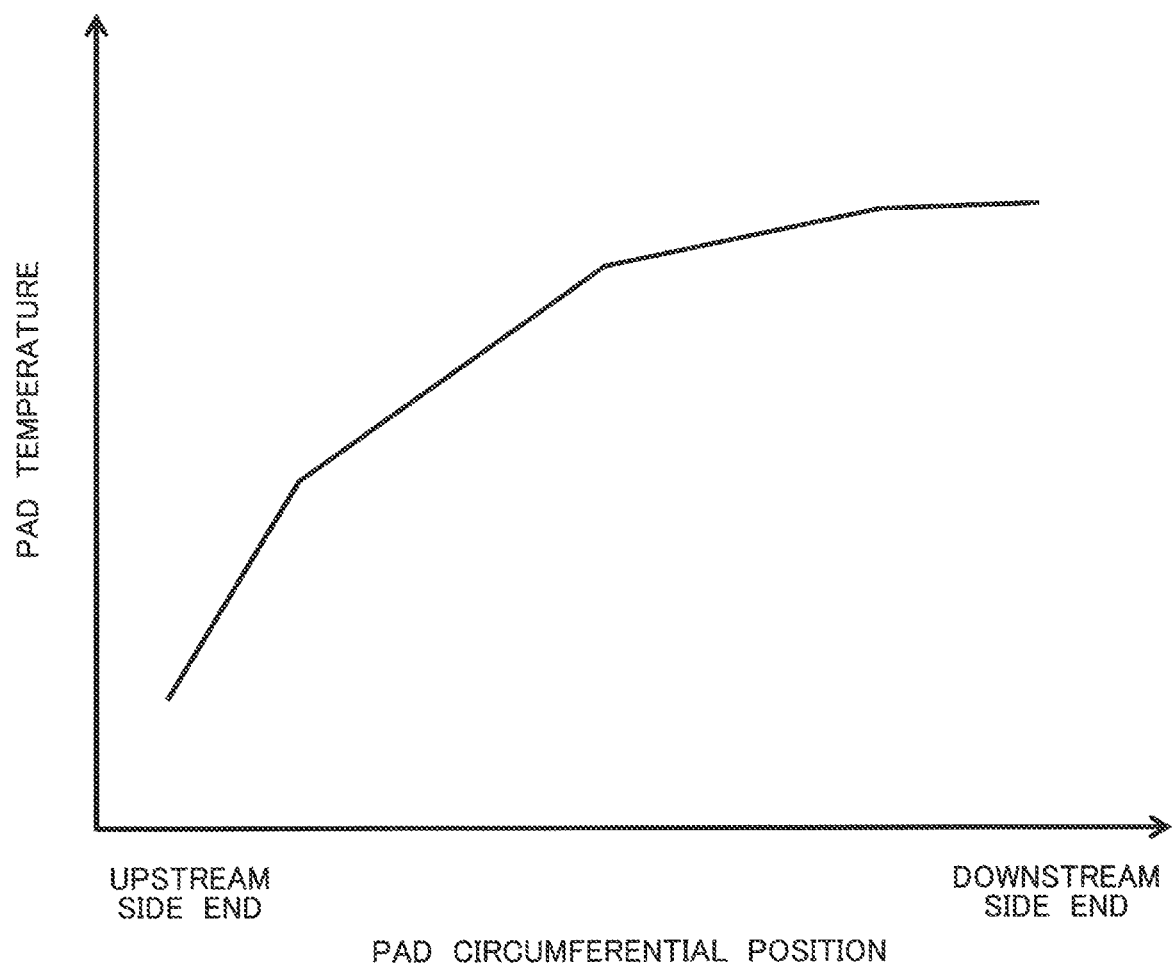
FIG. 4 is a schematic diagram showing relationship between a circumferential position of a general tilting pad and temperature in the vicinity of a sliding surface.

It is desirable that in the tilting pad 2 according to the present invention, the start position of the down step parts 16a and 16b provided on the sliding surface 2a in the circumferential direction is formed on the downstream side from the center. This effect will be described using FIG. 4. FIG. 4 is a schematic diagram showing relationship between circumferential position of a general tilting pad and temperature in the vicinity of the sliding surface.

As shown in FIG. 4, the temperature of the tilting pad 2 in the vicinity of the sliding surface 2a increases toward the downstream side, and becomes closer to a fixed value in the vicinity of the downstream end. The position where the heat generation becomes maximum corresponds to about the center of the pad where the channel width is the minimum. As the lubricating oil advances to the downstream side, it is heated, and the temperature is increased. By setting the step setting position on the circumferential downstream side, it is possible to improve the heat transfer coefficient especially on the downstream side where temperature margin is small with respect to the heat-resistant temperature of white metal. Further, it is possible to promote discharge of the lubricating oil, the temperature of which became high (carry-over oil) on the downstream side, in the axial direction. The carry-over oil which flowed to the downstream end of the sliding surface 2a further increases the temperature of the adjacent pad provided on the downstream side. Accordingly, by promoting discharge of the carry-over oil in the axial direction, it is possible to further reduce the pad temperature.

Accordingly, in the present example, as shown in FIG. 3A, a circumferential length L2 of the concave part 16 in an inner peripheral surface of the tilting pad 2 is equal to or smaller than ½ of a circumferential length L1 of the inner peripheral surface of the tilting pad 2. That is, an arc length L2 of the concave part 16 in the inner peripheral surface of the tilting pad 2 is set to ½ or smaller than an arc length L1 of the inner peripheral surface of the tilting pad 2.

Figure 5:
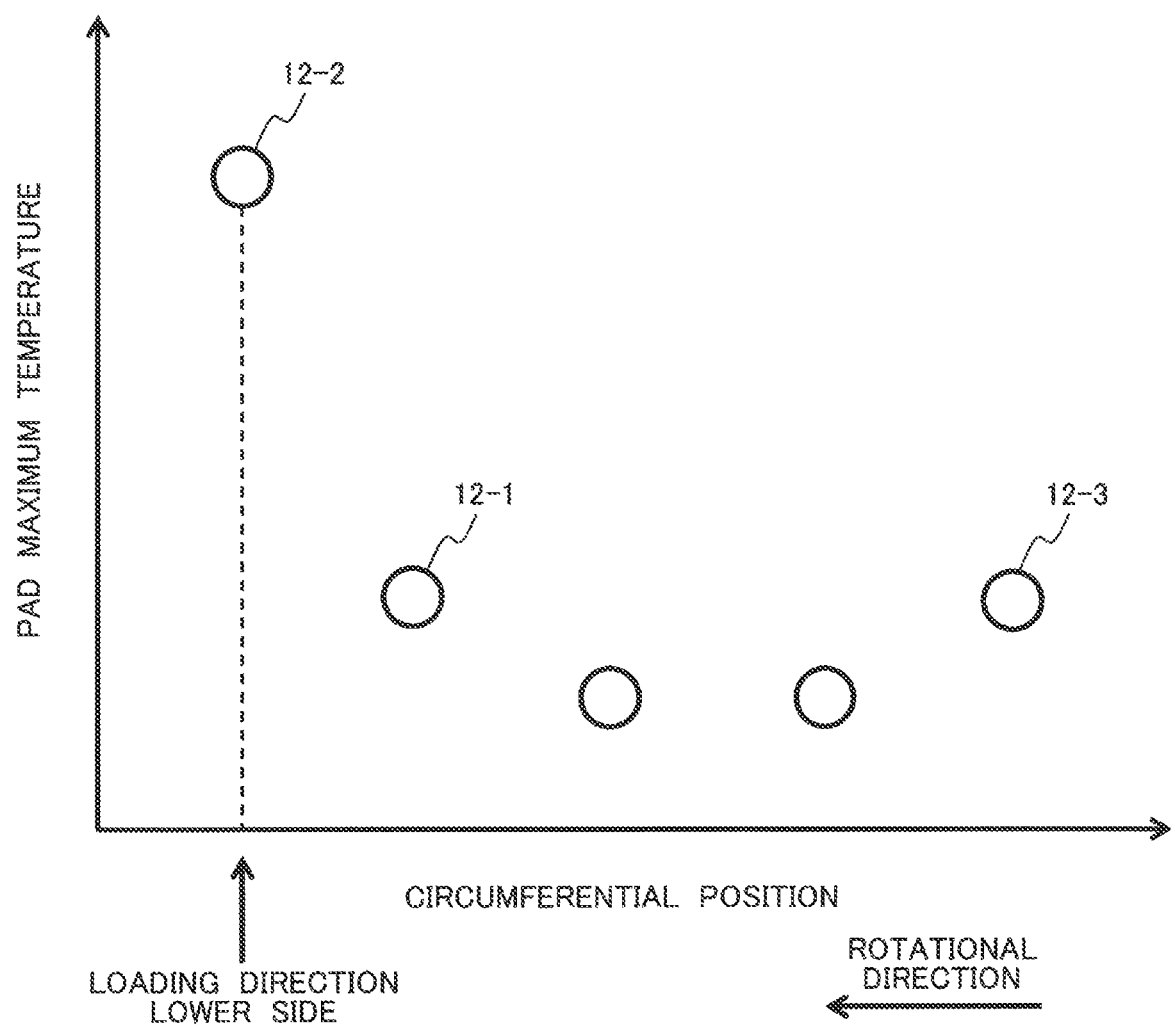
FIG. 5 is a schematic diagram showing relationship between circumferential positions of the respective tilting pads and maximum temperatures of the respective tilting pads in the vicinity of the sliding surface.

The temperature of the plural tilting pads 2 (2-1, 2-2, and 2-3) provided around the rotary shaft 1 will be described using FIG. 5. FIG. 5 is a schematic diagram showing relationship between the circumferential positions of the respective tilting pads and maximum temperatures in the vicinity of the sliding surfaces of the respective tilting pads.

In FIG. 5, numeral 12-1 denotes a pad maximum temperature of the tilting pad 2-1; 12-2, a pad maximum temperature of the tilting pad 2-2; and 12-3, a pad maximum temperature of the tilting pad 2-3.

In the tilting pad 2 positioned on the loading-direction lower side in the circumferential direction, the pad maximum temperature becomes remarkably high. Accordingly, in the present example, the down step parts 16a and 16b (concave part 16) are provided only in the tilting pad 2-2 (see FIG. 1) provided on the loading-direction lower side and the tilting pad 2-1 (see FIG. 1) provided on the rotational upstream side from the tilting pad 2-2. That is, it is possible to further reduce the pad temperature of the tilting pad 2-2 by increasing the heat transfer coefficient regarding the tilting pad 2-2 having high maximum temperature, and reducing the amount of the carry-over oil which flows in the tilting pad 2-2. Further, it is possible to suppress increase of oil scattering to the outside to the minimum by limiting the position to promote the discharge of the carry-over oil in the axial direction.

Note that when suppression of temperature rise of the tilting pad 2 is prioritized, the down step parts 16a and 16b (concave part 16) may be provided in other tilting pads 2 than the above-described tilting pads. The down step parts 16a and 16b (concave part 16) may be provided in all the tilting pads 2.

Example 2

Figure 6:
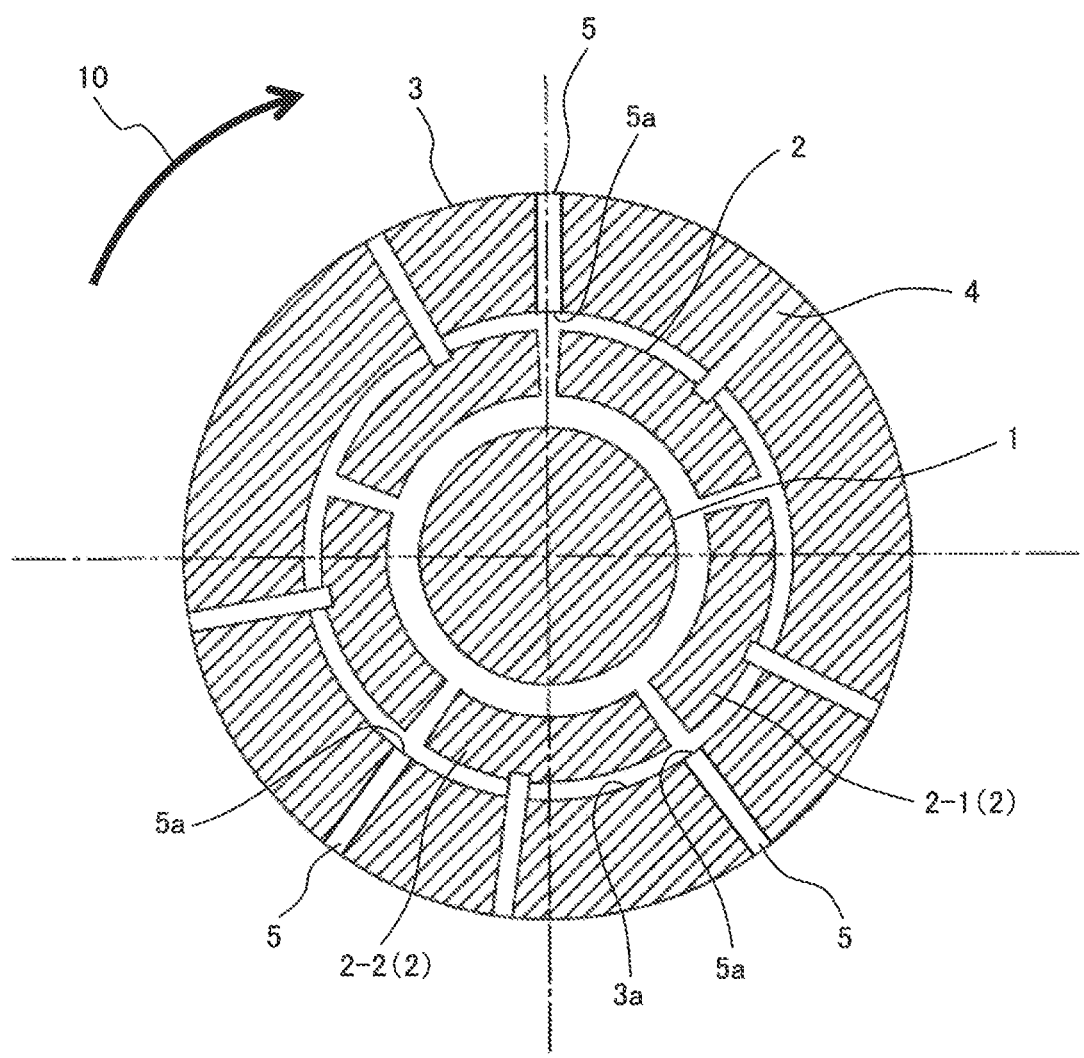
FIG. 6 is a schematic diagram showing a cross section of the tilting-pad-type journal bearing according to an example 2, viewed from the rotational-axis direction.

Next, an example 2 will be described with reference to FIG. 6. FIG. 6 is a schematic diagram showing a cross section of the tilting-pad-type journal bearing according to the example 2, viewed from the rotational-axis direction.

The tilting-pad-type journal bearing according to the present example is approximately the same as that in the example 1. The difference from the example 1 is that it is not a type of directed lubrication journal bearing but is a type of flood lubrication journal bearing. That is, as shown in FIG. 6, plural oil inlets 5, with while the radial position of the exit 5a of the oil inlet 5 being approximately the same as the inner diameter of the housing 3, are provided in the housing 3 in the circumferential direction. That is, the exit 5a of the oil inlet 5 is opened in an inner peripheral surface 3a of the housing 3. Further, although not shown, the width (size) of the inter-side plate gap 8 (see FIG. 2) is 1 mm or smaller, and the side plates 6 and the rotary shaft 1 are not in contact with each other. With this configuration, it is possible to hold the lubricating oil in space covered with the housing 3 and the side plates 6, and to supply the lubricating oil to the sliding surface of the tilting pad 2. In this case, especially the lubricating characteristic is well maintained. Further, the amount of oil scattering to the outside is small.

Example 3

Figure 7A:
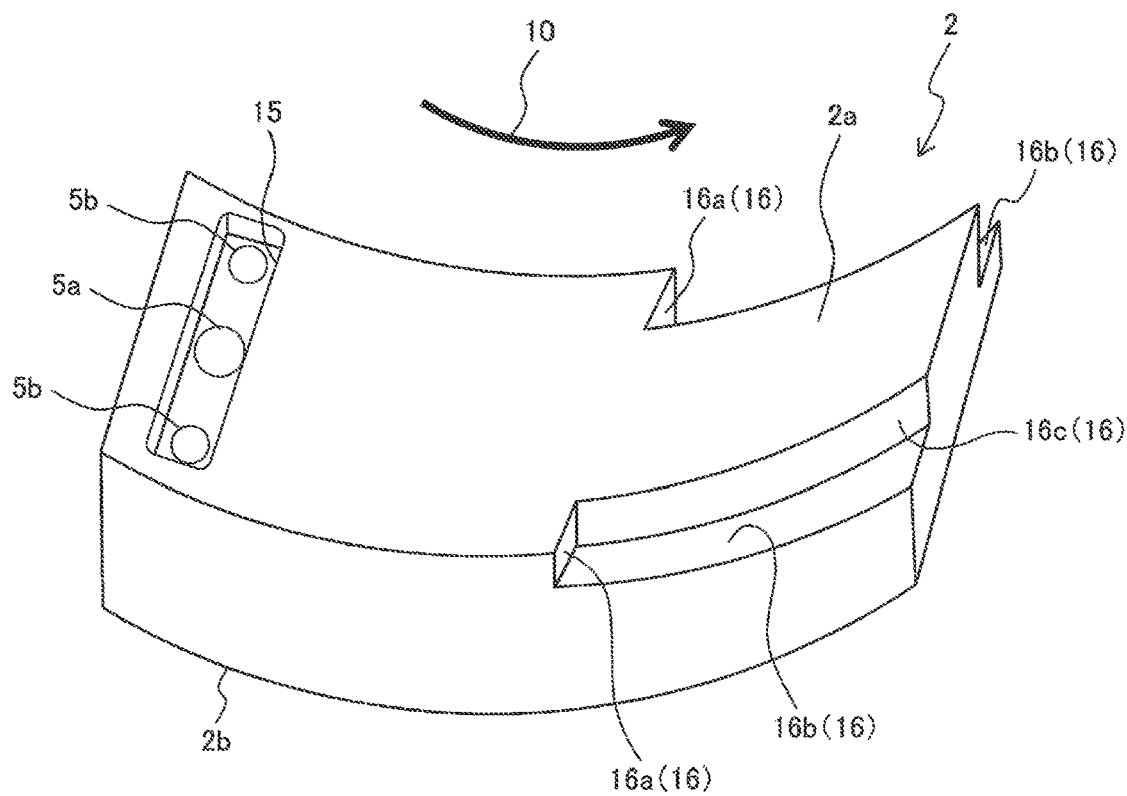
FIG. 7A is a schematic diagram of the tilting pad according to an example 3, viewed from the diagonal direction.
Figure 7B:
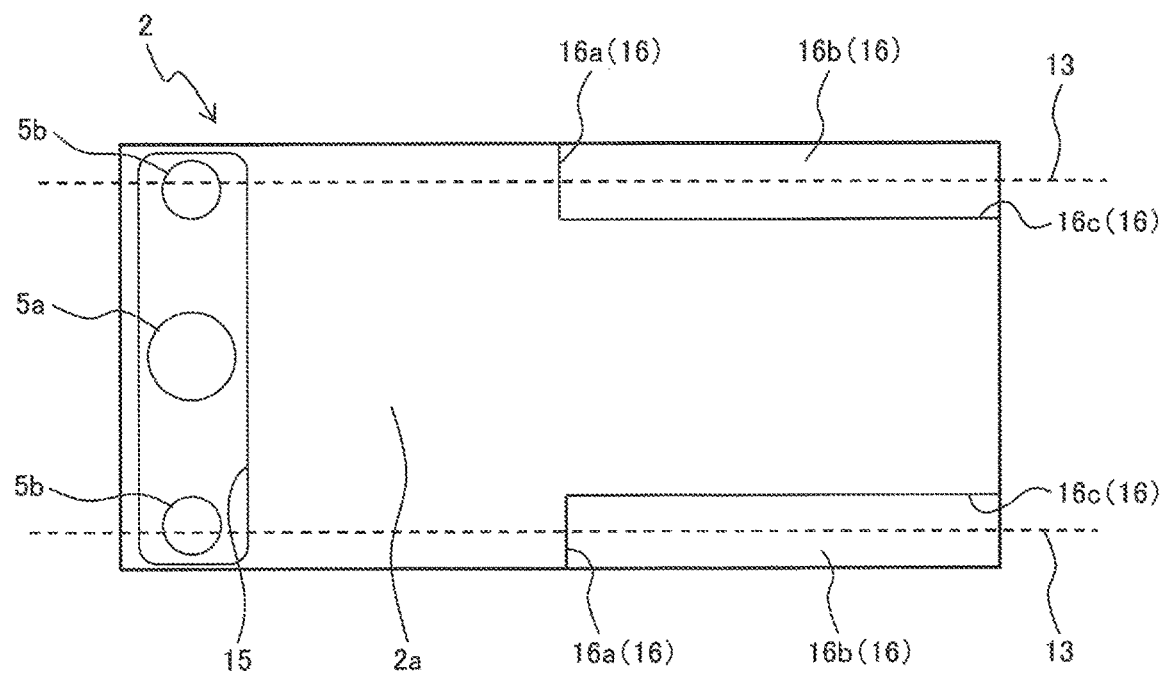
FIG. 7B is a schematic diagram (plan view) of the tilting pad according to the example 3, viewed from the bearing surface side.

Next, an example 3 will be described with reference to FIGS. 7A and 7B. FIG. 7A is a schematic diagram of the tilting pad according to the example 3, viewed from a diagonal direction. FIG. 7B is a schematic diagram (plan view) of the tilting pad according to the example 3, viewed from the bearing surface side.

The tilting-pad-type journal bearing according to the present example is approximately the same as that in the example 1. The difference from the example 1 is that as shown in FIGS. 7A and 7B, three oil inlet 5 is provided in the axial direction, and respectively provided at approximately axial center of the two down step parts 16a and 16b (concave part 16) and at the axial center of the tilting pad 2. With this configuration, it is possible to suppress axial bias of the lubricating oil flow in the axial direction, and to maintain the lubricating characteristic of the sliding surface 2a of the tilting pad 2 with oil feeding from the oil inlet 5a at the axial center. Further, it is possible to induce a lubricating oil flow approximately along an axial center line 13 of the down step parts 16a and 16b (concave part 16) by oil feeding from the oil inlet 5b on the both axial end sides. It is possible to further promote pad temperature reduction with the backward facing step flow.

The oil inlet 5a is formed to have an opening diameter larger than that of the other oil inlet 5b. With this configuration, it is possible to sufficiently supply the lubricating oil to the sliding surface 2a. Further, the oil inlet 5b is provided for prevention of shortage of the lubricating oil supplied to the down step parts 16a and 16b (concave part 16). As it is auxiliary part, it is smaller than the opening diameter of the oil inlet 5a.

The oil inlets 5a and 5b are provided such that the respective exits are opened in the bottom of the concave part 15 provided in the sliding surface 2a. The concave part 15 is formed to have a slim shape along the axial direction. Three oil inlets 5a and 5b are provided in one concave part 15.

Example 4

Figure 8:
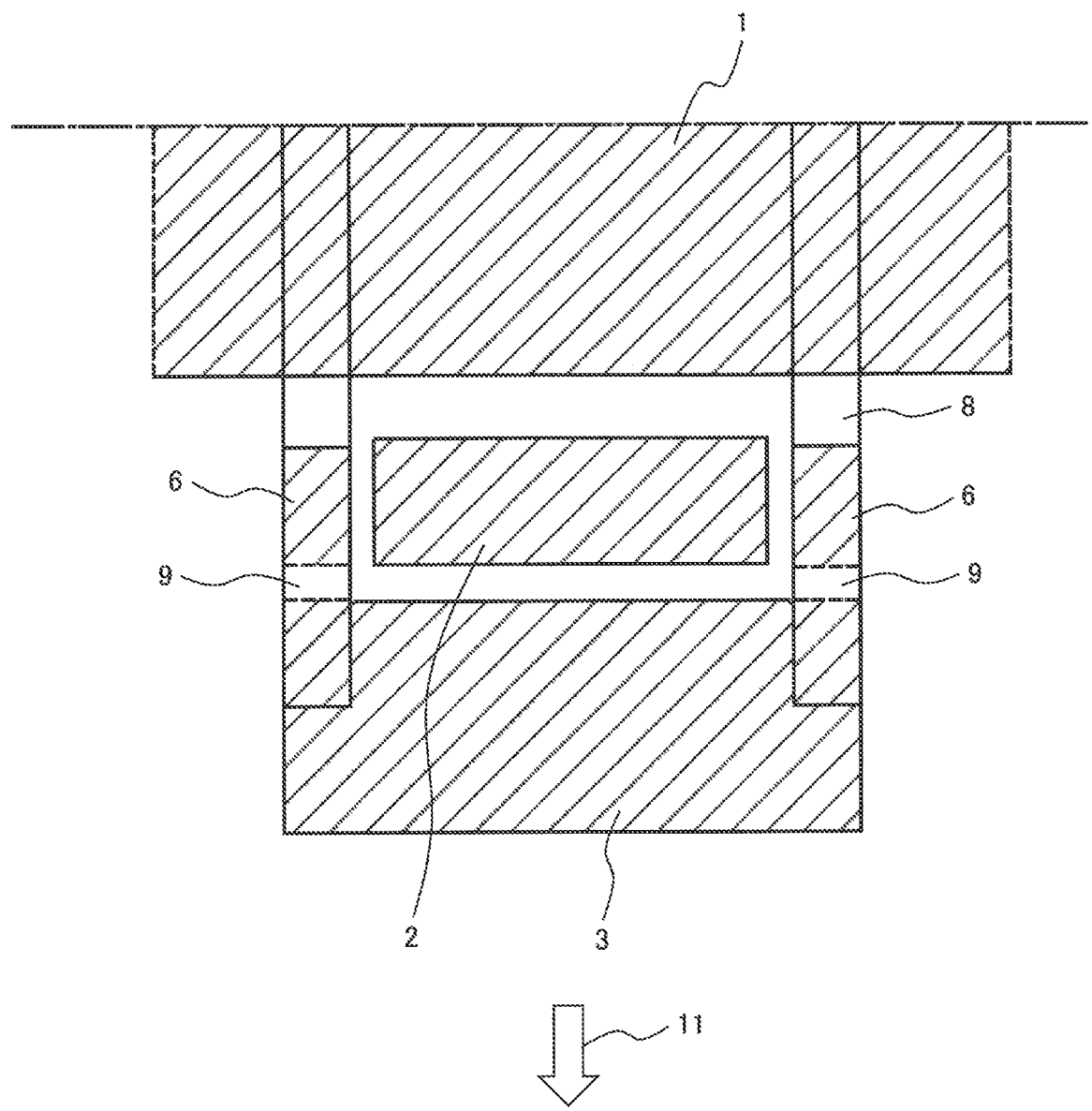
FIG. 8 is a cross-sectional diagram of the tilting-pad-type journal bearing according to an example 4, viewed from the direction vertical to the rotational-axis direction, and a schematic diagram showing the one side with respect to the rotational-axis center.
Figure 9:
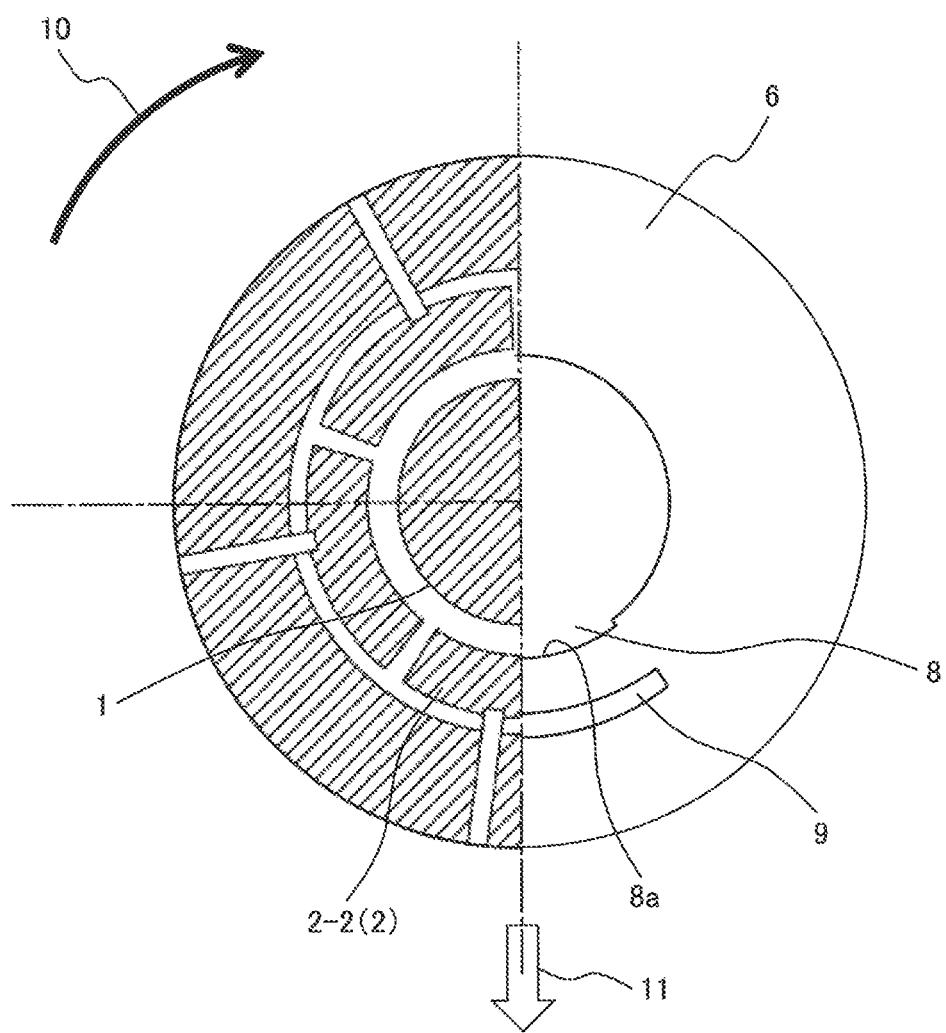
FIG. 9 is a diagram of the tilting-pad-type journal bearing according to the example 4, viewed from the rotational-axis direction, and a schematic diagram where a side plate and the cross section are overlapped such that with respect to a straight line passing through the rotational-axis center, one side shows the side plate, while the other side shows the cross section.

Next, an example 4 will be described with reference to FIGS. 8 and 9. FIG. 8 is a cross-sectional diagram of the tilting-pad-type journal bearing according to the example 4, viewed from the direction vertical to the rotational-axis direction, and a schematic diagram showing the one side with respect to the rotary shaft center. FIG. 9 is a diagram of the tilting-pad-type journal bearing according to the example 4, viewed from the rotational-axis direction, and a schematic diagram where a side plate and the cross section are over-lapped such that with respect to a straight line passing through the rotational-axis center, one side shows the side plate, while the other side shows the cross section.

The tilting-pad-type journal bearing according to the present example is approximately the same as that in the example 1. The difference from the example 1 is that an opening 9 is provided in the side plate 6. The opening 9 is provided in a circumferential and radial position approximately facing the gap between the housing 3 and the lowest tilting pad 2-2. With this configuration, it is possible to promote discharge of the oil flowing through the gap between the housing 3 and the lowest tilting pad 2-2 in the axial direction.

A part of the carry-over oil which has not been discharged flows to the outer peripheral side of the tilting pad 2. When the carry-over oil stays on the outer peripheral side, the temperature of the tilting pad 2 is increased. Accordingly, it is possible to effectively lower the temperature of the lowest tilting pad 2-2 by promoting discharge of the carry-over oil.

Further, in the present example, in the position of the sliding surface of the lowest tilting pad 2-2, or the circumferential position facing the side end of the tilting pad 2-2 in the rotational-axis direction, the inter-side plate gap 8 is enlarged further in radial direction than the other circumferential positions. That is, an enlarged part 8a is provided in the inter-side plate gap 8. It is possible to further lower the pad temperature of the lowest tilting pad 2-2 by increasing the discharge amount of the carry-over oil between the rotary shaft 1 and the lowest tilting pad 2-2.

The configuration with the opening 9 and the configuration where the inter-side plate gap 8 is enlarged in the radial direction in the sliding surface position of the lowest tilting pad 2-2 or in the circumferential position facing the side end of the tilting pad 2-2 in the rotational-axis direction may be simultaneously adopted, or one of the configurations may be adopted.

The present example may be applied to the flood type tilting-pad-type journal bearing according to the example 3.

Example 5

Figure 10:
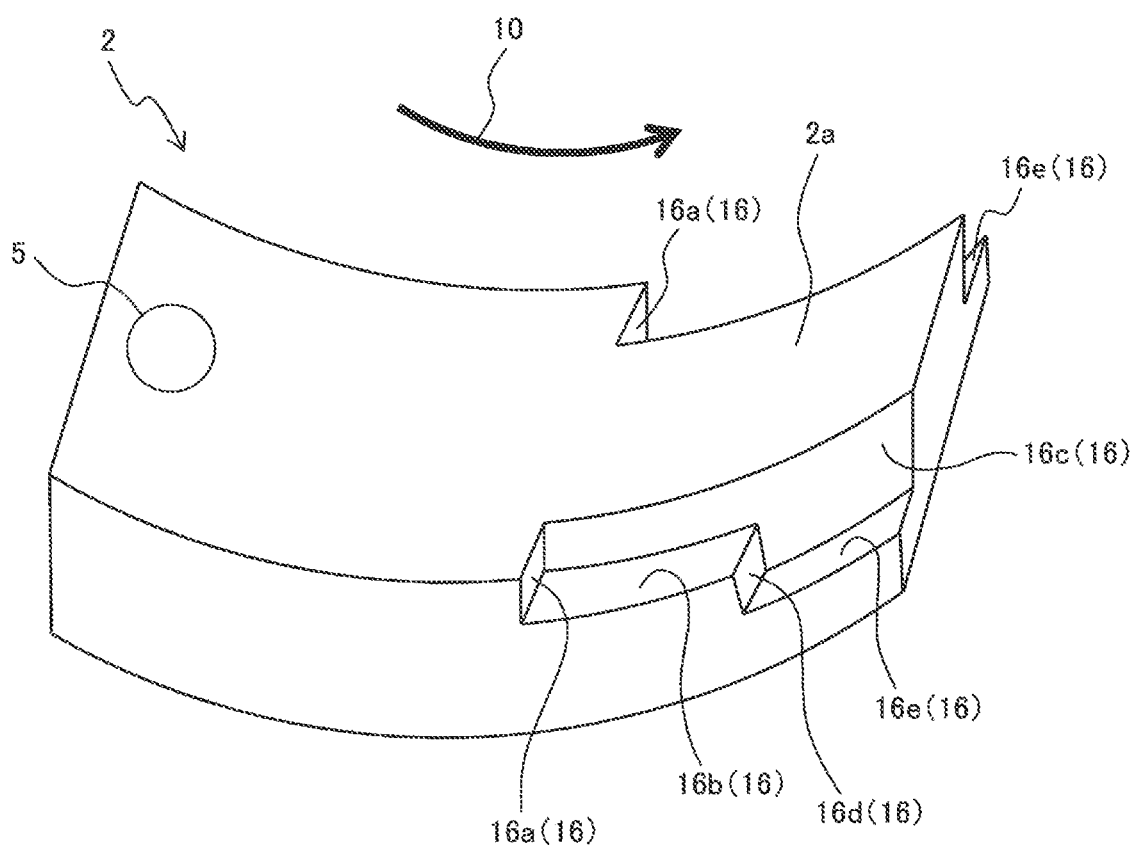
FIG. 10 is a schematic diagram of the tilting pad according to an example 5, viewed from the diagonal direction.

Next, an example 5 will be described with reference to FIG. 10. FIG. 10 is a schematic diagram of the tilting pad according to the example 5, viewed from a diagonal direction.

The tilting-pad-type journal bearing according to the present example is approximately the same as that in the example 1. The difference from the example 1 is that the down step part provided in the tilting pad 2 has two steps. That is, the down step part according to the present example is provided with, on the rotational downstream side of a first down step part formed with the down step surface 16a and the bottom surface 16b, a second down step part formed with a down step surface (down step surface from the rotational upstream side toward the downstream side) 16d formed from the bottom surface 16b formed as an upper surface toward the back surface side of the tilting pad 2, a bottom surface 16e formed as a lower surface, and a down step surface (side surface of the concave part 16) 16c from the center side of the pad sliding surface 2a to the end.

The range where the heat transfer coefficient becomes especially high with the backward facing step flow is approximately a region where the separating flow 14b (see FIG. 3B) is separated until it is re-attached. That is, when the circumferential length of the tilting pad 2 is long and the step part has one step, in the vicinity of the downstream side end of the tilting pad 2, the effect of the increase of heat transmission with induction of the backward facing step flow is small. Accordingly, by providing plural steps, it is possible to increase the range where the heat transfer coefficient becomes high, and to further reduce the temperature of the tilting pad 2.

The down step part may be provided not only with two steps but with more steps.

According to the above-described examples, in the directed type tilting-pad-type journal bearing having high pad cooling effect, it is possible to supply low-temperature lubricating oil sufficient to maintain lubricating characteristic, and to prevent or suppress oil scattering to other parts provided in a rotational-axis direction with respect to the pad. With this configuration, it is possible to provide a tilting-pad-type journal bearing capable of improving pad cooling performance of lubricating oil and reducing pad temperature with a simple configuration.

Note that the present invention is not limited to the above-described respective examples, but includes various modifications. For example, the above examples have been described in detail for explaining the present invention, and the invention is not necessarily limited to an example having all the described constituent elements. Further, a part of constituent element of an example may be replaced with those of another example. Further, constituent elements of an example may be replaced with those of another example, and further, constituent elements of an example may be added to those of another example. Further, it is possible to perform addition/deletion/replacement with respect to a part of constituent elements of the respective examples with other constituent elements.

REFERENCE SIGNS LIST

1 . . . rotary shaft, 2 . . . tilting pad, 2a . . . sliding surface, 2-2 . . . lowest tilting pad, 3 . . . housing, 4 . . . fixing structure, 5 . . . oil inlet (oil feed pipe or oil nozzle), 6 . . . side plate, 7 . . . inter-side surface gap between side plate 6 and tilting pad 2, 8 . . . inter-side plate gap between side plate 6 and rotational axis 1, 9 . . . opening of side plate 6, 10 . . . axial rotation direction, 11 . . . loading direction, 12-1 . . . pad maximum temperature of tilting pad 2-1, 12-2 . . . pad maximum temperature of tilting pad 2-2, 12-3 . . . pad maximum temperature of tilting pad 2-3, 13 . . . center line of step part, 14a . . . main stream, 14b . . . separating flow, 14c . . . re-attaching flow, 14d . . . vortex flow, 16 . . . concave part, 16a . . . down step surface from rotational upstream side toward downstream side, 16b . . . bottom surface, 16c . . . down step surface (side surface of concave part 16) from center side of pad sliding surface 2a toward end, 16d . . . down step surface from rotational upstream side of second concave part toward downstream side, and 16e . . . bottom surface of second concave part.

The invention claimed is:
1. A tilting-pad-type journal bearing comprising:
a rotary shaft;
a plurality of tilting pads that support the rotary shaft in a radial direction;
a housing that accommodates the plurality of tilting pads inside;
a fixing structure that fixes a circumferential relative position with respect to the housing while allowing the tilting pads to swing;
an oil inlet that supplies lubricating oil between the tilting pads and the rotary shaft; and
side plates provided on both sides of the housing in a rotational-axis direction, wherein among the plurality of tilt pads, a tilting pad provided in at least a lowest position with a loading direction as a downward direction, and a tilting pad provided adjacent on the rotational upstream side of the tilting pad provided in the lowest position, have a concave part at both side ends of the sliding surface in the rotational-axis direction, the concave portion formed by a first down step part from a sliding surface facing the rotary shaft and a second down step part from the sliding surface and a third down step part, wherein the first down step part makes a down step facing toward a rotational downstream side and the second down step part makes a down step from a center side of the tilt pad in the rotational-axis direction facing toward a rotational-axis direction side end, and in the concave part, a side of the tilting pad in the rotational-axis direction is opened toward the inside of the housing.

2. The tilting-pad-type journal bearing according to claim 1, wherein in the concave part, the end side of the tilting pad on the rotational downstream side is opened toward the inside of the housing.

3. The tilting-pad-type journal bearing according to claim 2, wherein the first step down part is formed to have a height larger than half of a difference between a radius of the sliding surface and a radius of the rotary shaft.

4. The tilting-pad-type journal bearing according to claim 2, wherein a ratio between an outer peripheral surface width and a sliding surface width on the end side of the tilting pad on the rotational downstream side is 0.7.

5. The tilting-pad-type journal bearing according to claim 2, wherein the first step down part is formed on the rotationally downstream side from a center of the tilting pad in the circumferential direction.

6. The tilting-pad-type journal bearing according to claim 2, wherein the oil inlet includes at least three oil inlets that are provided in the tilting pad along the rotational-axis direction.

7. The tilting-pad-type journal bearing according to claim 2, wherein an exit of the oil inlet is opened in a part of the sliding surface of the tilting pad on the rotational upstream side, and wherein a gap between the side plate and the rotary shaft is 2 mm or larger.

8. The tilting-pad-type journal bearing according to claim 7, wherein an opening is provided in a radial position of the side plate facing a gap between the housing and an outer peripheral surface of the tilting pad provided in the lowest position, and wherein the gap between the side plate and the rotary shaft in a circumferential position of the tilting pad provided in the lowest position facing the side end in the rotational-axis direction is formed to be wider than other circumferential positions.

9. The tilting-pad-type journal bearing according to claim 2, wherein an exit of the oil inlet is opened in an inner peripheral surface of the housing, and wherein a gap between the side plate and the rotary shaft is 1 mm or smaller, and the side plate and the rotary shaft are in a non-contact state.

10. The tilting-pad-type journal bearing according to claim 9, wherein an opening is provided in a radial position of the side plate facing a gap between the housing and the tilting pad provided in a lowest position, and wherein the gap between the side plate and the rotary shaft in a circumferential position of the tilting pad provided in the lowest position facing the side end in the rotational-axis direction is formed to be wider than the other circumferential positions.

11. The tilting-pad-type journal bearing according to claim 2, wherein the concave part further comprises a fourth down step part and a fifth down step part forming a concave part with a stepped configuration.

* * * * *